(12) United States Patent
Narasimhan et al.

(10) Patent No.: US 11,210,645 B2
(45) Date of Patent: Dec. 28, 2021

(54) PROVIDING MULTIPLE AUTHENTICATION ELEMENTS VIA A POINTING DEVICE FOR USER AUTHENTICATION

(71) Applicant: PAYPAL, INC., San Jose, CA (US)

(72) Inventors: Srivathsan Narasimhan, Saratoga, CA (US); Cheng Tian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 461 days.

(21) Appl. No.: 15/851,518

(22) Filed: Dec. 21, 2017

(65) Prior Publication Data

US 2019/0197508 A1 Jun. 27, 2019

(51) Int. Cl.
*G06Q 20/20* (2012.01)
*G06Q 20/40* (2012.01)
*G06Q 20/38* (2012.01)

(52) U.S. Cl.
CPC ....... *G06Q 20/206* (2013.01); *G06Q 20/4016* (2013.01); *G06Q 20/3825* (2013.01)

(58) Field of Classification Search
CPC ............ G06Q 20/206; G06Q 20/4016; G06Q 20/3825
USPC .................................................... 705/18, 44
See application file for complete search history.

(56) References Cited

U.S. PATENT DOCUMENTS

| 6,021,202 | A | * | 2/2000 | Anderson | ............. | G06F 40/166 |
| | | | | | | 705/54 |
| 9,372,976 | B2 | | 6/2016 | Bukai | | |
| 9,378,518 | B2 | | 6/2016 | Zank | | |
| 9,690,431 | B2 | | 6/2017 | Shahparnia et al. | | |
| 2005/0122209 | A1 | * | 6/2005 | Black | ................... | G06Q 20/341 |
| | | | | | | 340/5.52 |
| 2006/0119541 | A1 | * | 6/2006 | Blythe | ................... | G06F 3/0321 |
| | | | | | | 345/31 |
| 2006/0215886 | A1 | | 9/2006 | Black | | |
| 2010/0155153 | A1 | | 6/2010 | Zachut | | |
| 2012/0242603 | A1 | * | 9/2012 | Engelhardt | ........... | G06F 3/0383 |
| | | | | | | 345/173 |

(Continued)

FOREIGN PATENT DOCUMENTS

| EP | | 3411822 B1 | * 12/2020 | .......... H04W 12/065 |
| WO | WO 2017/034240 | | 3/2017 | |
| WO | WO 2017/175169 | | 10/2017 | |

OTHER PUBLICATIONS

Moray, Deepali, Facial recognition is passe, Microsoft wants to build stylus-based authentication, May 2, 2017, BGR.in.*

*Primary Examiner* — Russell S Glass
(74) *Attorney, Agent, or Firm* — Haynes and Boone, LLP

(57) ABSTRACT

A method for authenticating access to remote devices. The method includes receiving authentication data for authenticating a user for using a pointing device at an input of a Point-of-Sale (PoS) device for initiating of a transaction. The method includes receiving a user input that includes an authenticating input, the user input provided via the pointing device at an input device of the POS device, the authenticating input for authenticating the user for the transaction. The method includes accessing encoded data that is embedded in the user input, and determining a correlation between the authentication data and the encoded data. The method includes determining, based on the correlation and the authenticating input, authentication for initiating the transaction by the user at the POS device.

20 Claims, 5 Drawing Sheets

(56) References Cited

U.S. PATENT DOCUMENTS

| | | | |
|---|---|---|---|
| 2013/0148024 A1* | 6/2013 | Shin | H04N 21/441 |
| | | | 348/552 |
| 2015/0100442 A1 | 4/2015 | Van Heerden et al. | |
| 2017/0094514 A1 | 3/2017 | Kelts et al. | |
| 2017/0109516 A1* | 4/2017 | Engelhardt | G06F 3/03545 |
| 2018/0253461 A1 | 9/2018 | Goel et al. | |
| 2018/0365670 A1* | 12/2018 | Dunjic | G06Q 20/206 |
| 2019/0278893 A1* | 9/2019 | Eisen | G06F 3/03547 |

* cited by examiner

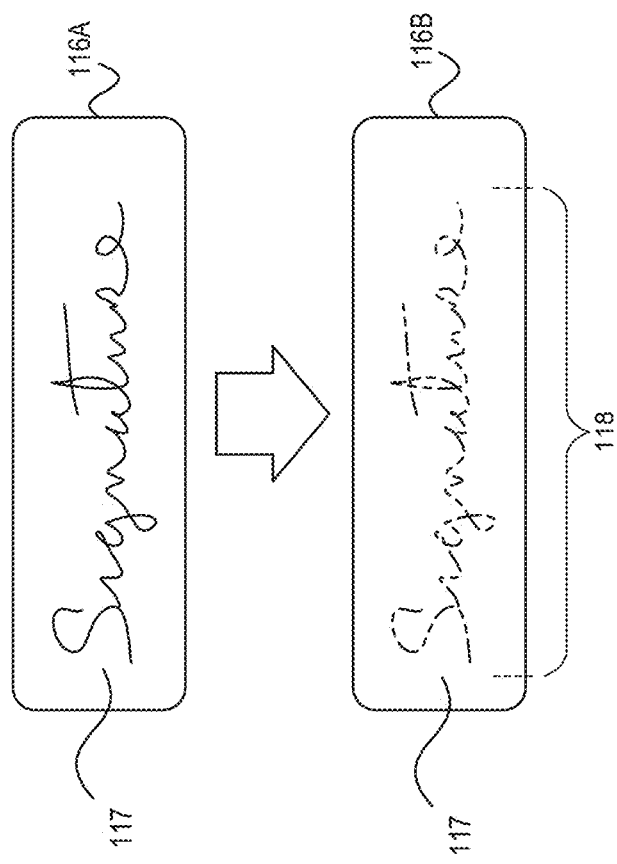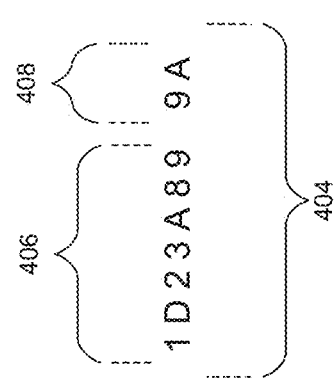
FIG. 3
FIG. 4

PROVIDING MULTIPLE AUTHENTICATION ELEMENTS VIA A POINTING DEVICE FOR USER AUTHENTICATION

BACKGROUND

Embodiments of the inventive subject matter generally relate to the field of communication networks, and, more particularly, to providing authentication over communication networks for secure transactions.

A user can access devices that interface with transaction systems for initiating authenticated transactions. The transaction system and/or the corresponding device can require user authentication prior to initiating the transaction. For example, a Point-of-Sale (POS) device can require user authentication for payment transactions initiated by a customer of the POS terminal. A Point-of-Sale device is a device that can process transactions, such as payments, from a buyer to a seller for ordered items and/or services. The user can provide a signature, a unique code, and/or other credentials at the POS terminal to initiate the authentication process. However, often the authentication process at the POS device is not strong enough to deter fraudulent uses. Thus, the transaction systems can incur losses from not being able to accurately determine fraudulent users.

BRIEF DESCRIPTION OF THE DRAWINGS

The present embodiments may be better understood, and numerous objects, features, and advantages made apparent to those skilled in the art by referencing the accompanying drawings.

FIG. 3 is a diagram illustrating embodiments of authenticating input and associated encoded data.

FIG. 4 is a diagram illustrating embodiments of encoded data that is embedded in user input.

DESCRIPTION OF EMBODIMENT(S)

Figure 1:
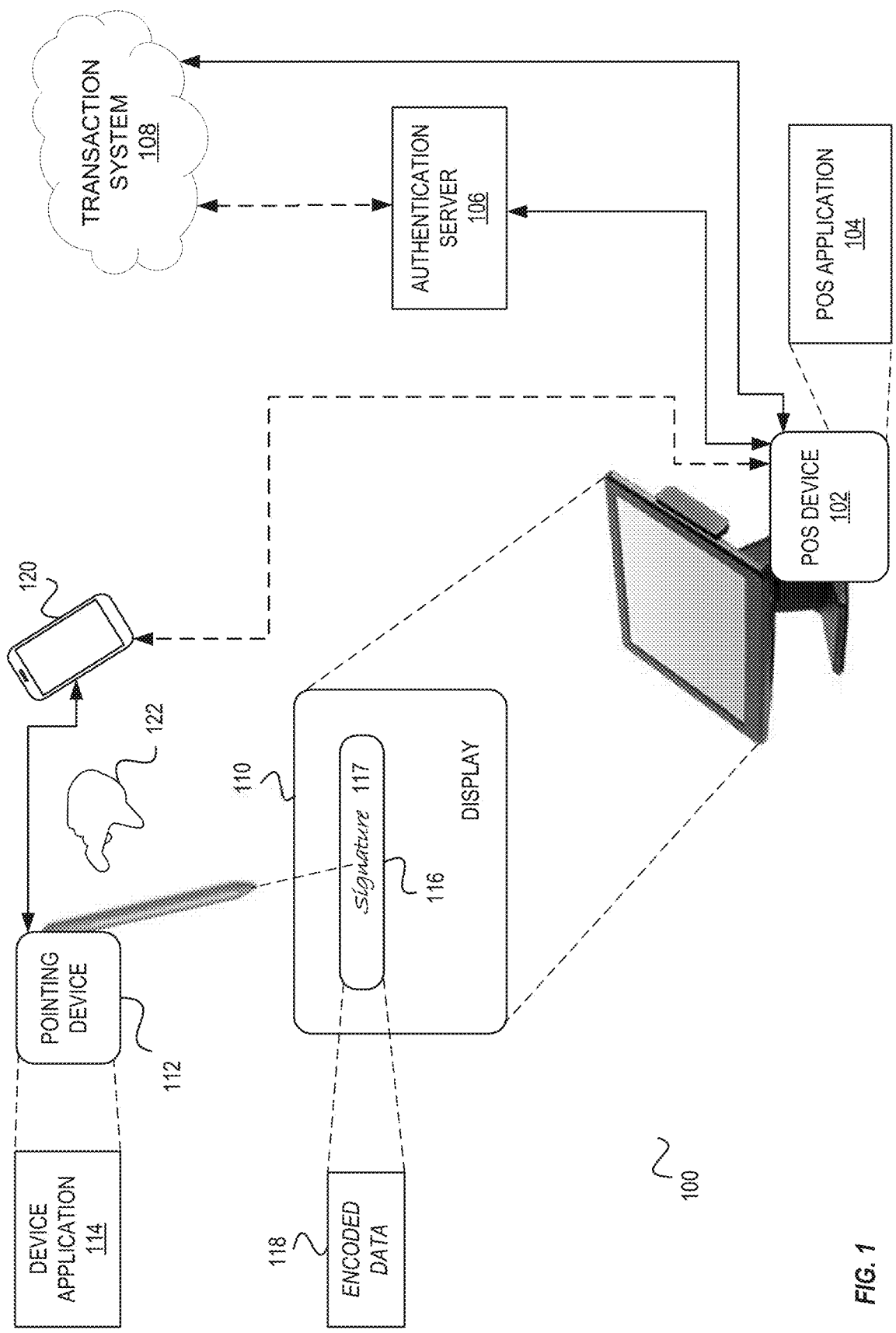
FIG. 1 is a system diagram illustrating embodiments of a system for facilitating authentication via a pointing device for secure transactions.

The description that follows includes exemplary systems, methods, techniques, instruction sequences and computer program products that embody techniques of the present inventive subject matter. However, it is understood that the described embodiments may be practiced without these specific details. For instance, although many examples refer to authenticating a user for a transaction at POS devices used with payment systems, authentication methods described herein can be used with other devices and systems. For example, the authentication methods can be used to authenticate users when accessing secure document systems, signature capture devices, and/or other authentication systems. Furthermore, although many examples are directed to receiving user input via touchscreens and other related input devices, the techniques described herein contemplate receiving user input via augmented reality (AR) and/or virtual reality (VR) input devices.

A user, e.g., a customer, can access authentication devices to initiate transactions at a transaction system. The transaction system can require user authentication, such as via the authentication device, prior to initiating the transaction. A Point-of-Sale (POS) device can implement authentication functionality of the authentication device. The POS device can process transactions, such as payments, from a buyer to a seller for items and/or services offered by the merchant and requested by the customer. The transaction can be any type of commerce transaction or other transaction that requires authentication, such as contracts, property transfers, loans, among others. The transaction can be for a software service (e.g., a software-as-a-service (SaaS)) that can be provided to customer. The customer can provide a signature, a unique code, and/or other credentials at the POS device to initiate the authentication process. The methods described herein provide a robust authentication process at the POS device to determine and deter fraudulent uses. Although this description refers to using POS devices, other authentication devices can be used. For example, the authentication device can be used during buyer's access to an on-line authentication system, i.e., not at a physical store.

The transaction system can provider an easier and more secure method for authenticating access to transactions initiated at remote devices. The method can be implemented by a POS device (or another device that receives user input and determines user authentication) that includes an input device for accepting user input. The POS device can be accessed by the customer initiating a transaction. The customer can use a pointing device (such as a stylus device and/or a digital pen) to provide the user input at the input device, such as at a touch screen of the POS device. The POS device can receive the user input that includes an authenticating input and encoded data. The POS device can also receive authentication data for authenticating the customer for using the pointing device for initiating of the transaction.

The authenticating input can be provided for authenticating the customer for the transaction. The authenticating input can be a textual input such the customer's signature, or another type of manual entry made by the customer using the pointing device. The POS device can also access encoded data that is embedded, by the pointing device, in the user input. The encoded data can be provided as a sequence of symbols and/or a pattern. The encoded data can be a type of a key, a token, and/or an authenticating identifier that is provided for authentication of the customer by the POS device. The POS device can determine a correlation between the authentication data and the encoded data. The POS device can then determine, based on the correlation and the authenticating input, authentication of the user for initiating of the transaction at the POS device.

Therefore, the methods described herein allow a user to use an pointing device to provide several authentication elements to the POS device for an easier and more secure method for authenticating a user for initiating transactions. The pointing device can provide the authenticating user input (e.g. as used by the customer) as well as encoded data that is embedded into the user input. These authentication elements, along with the authentication data, can be used by the POS device to quickly authenticate the customer for initiating of the transaction at the POS device. The following description, and associated Figures, illustrates various embodiments directed to the ideas listed above.

FIG. 1 is a system diagram illustrating embodiments of a system for facilitating authentication via a pointing device for secure transactions. In an overview of a system diagram 100, a POS device 102 includes a display 110. The POS device 102 also hosts a POS application 104 that can authenticate the customer for initiating a transaction at the POS device. The POS device 102 can communicate with an authentication server 106 that aids with the authentication process. The POS device 102 can receive input from a pointing device 112, and determine whether to authenticate the user based on this input. The POS device 102 can communicate with the transaction system 108 that processes the transaction. The POS device 102 can be a terminal, a mobile POS, and/or a mobile device that can be used to initiate customer transactions once the customer is authenticated. The POS device 102 can receive authentication elements from the pointing device, a user device 120, and/or other devices. Based on the authentication elements, the POS device 102 can determine, locally via the POS application 104 and/or via communicating with the authentication server 106, authentication of the customer.

The POS application 104 can be an application, hosted by the POS device 102, that facilitates transactions between the customer and the merchant. The POS application 104 can receive and process customer transactions. The POS application 104 can locally authenticate the user and/or the pointing device 112 for the transaction, or can communicate with the authentication server 106 to perform this authentication. The POS application 104 can communicate with the transaction system 108 to complete the transaction. The POS application 104 can be a stand-alone application, or a client functionality accessed via a web browser. The POS application 104 can be used to authenticate the customer to access the user account at the transaction system 108. In some embodiments, the POS application 104 can authenticate the customer for the transaction that is processed off-line, i.e., without communicating with the transaction system 108.

The authentication server 106 can receive information (such as one or more authentication elements) from the POS device 102, and provide authentication determination to the POS device 102. The authentication server 106 can provide customer information to the POS device 102. The transaction system 108 can be an open-loop or a closed-loop transaction system. In either implementation, the transaction system 108 can process the transaction using the authentication indication (e.g., whether the customer has been authenticated at the POS device 102 based on the authentication elements).

The POS device 102 can communicate with the transaction system 108 to initiate the transaction. The transaction can be for purchase of a product and/or service that is offered by the merchant. The transaction can be for a transfer of funds between a user account at the transaction system 108 and another account (such as at the transaction system 108 or at another system). The transaction can be for initiating a software service (e.g., a software-as-a-service (SaaS)) that can be provided to the user device 120 by the transaction system 108. The transaction system 108 may require the authentication from the POS device 102 prior to processing of the transaction.

The POS device 102 can receive authentication data from the pointing device 112 or the user device 120, where the authentication data is an authentication element. The authentication data can be implemented as a user name of the customer. The authentication data can be implemented as an authentication token that maps, such as at an authentication server 106, to a user name and/or password for the customer. The authentication data can be implemented as a key that authenticates the customer for using the pointing device 112 at the POS device 102. The authentication data can indicate that the pointing device 112 is associated with the user device 120, where the user device is a trusted device. The authentication data can be implemented as a key that authenticates the customer for using the pointing device 112 at the POS device 102. The authentication data can be implemented as a verification code, such as a one-time code, for confirming identity of the customer.

The POS device 102 includes a display 110 that can implement an input device that can receive user input in addition to being able to displaying images and/or text. The input device of the POS device 102 can be implemented by a trackpad and/or other touch-based interfaces. For example, the display 110 can be implemented by a touchscreen that can receive user input. The user input can be processed to determine one or more authentication elements used for authentication of the customer.

In some embodiments, the POS device 102 can receive the authentication data from the pointing device 112. The authentication data can indicate that the pointing device 112 received the authentication data from the user device 120, thus providing another authentication element to the POS device 102. For example, the authentication data can include timestamps and/or device specific information like device identifier, profile and other digital fingerprints indicating that the authentication data originated at the user device 120 and then was transmitted to the pointing device 112. Transmission of the authentication data from the user device 120 to the pointing device 112 can be triggered by the user device 120 being in close proximity (e.g., within a certain predefined distance) with the POS device 102 and/or with the pointing device 112. The pointing device 112 can transmit the authentication data to the POS device 102 responsive to determining that the pointing device 112 is in close proximity (e.g., within a certain predefined distance) of the POS device 102.

In some embodiments, the user device 120 can periodically transmit current authentication data (e.g., a current and valid version of the authentication data) to the pointing device 112. In some embodiments, the user device 120 can communicate the authentication data to the POS device 102 directly, i.e., without relaying the authentication data through the pointing device 112. The user device 120 can trigger this direct communication based a determination that the user device 120 is in close proximity with the POS device 102 and/or with the pointing device 112.

The pointing device 112 can be implemented by a stylus and/or a digital pen. The pointing device 112 can be used to draw or make selections at an input device of the POS device 102, such as the display 110 that uses a touch screen. The pointing device 112 can be implemented by a glove or another wearable (as shown at 122) that can provide input to the input device of the POS device 102. In some embodiments, the pointing device 112 can be associated with the POS device 102. In other embodiments, the pointing device 112 can be associated with the customer, such as with user of the user device 120.

The pointing device 112 can host a device application 114 that can be configured to generate the encoded data. The device application 114 can provide the encoded data in the user input at the input device. The device application 114 can provide the encoded data responsive to detecting that the user is using the pointing device 112 to provide the authenticating input and/or that the pointing device 112 is in proximity of the POS device 102. While the pointing device 112 is used by the user to provide user input 116 at the input device of the POS device 102, the device application 114 can provide the encoded data 118 embedded in the authenticating input 117. In some embodiments, the device application 114 can provide the encoded data responsive to receiving a handshake signal (if handshake communication is being used) from the POS device 102. The device application 114 can establish the handshake communication between the pointing device 112 and the POS device 102. The handshake signal can indicate that the pointing device is to provide the encoded data during application of the user input.

The input device can be implemented as a resistive touchscreen, a capacitive touchscreen, an acoustic wave touchscreen, and/or a photosensitive screen. Although the examples described herein refer to touchscreens, a touchpad can be used instead. In some embodiments, the input device can be implemented via an augmented reality or virtual reality input system. In some embodiments, the encoded data can be provided to the input device using a modulation of the input signal using the same technique as input device accesses the authenticating input. Thus, for capacitive touchscreens, the encoded data can be provided as a modulation of the electrical signal provided to the input device. In other embodiments, the encoded data can be provided using another technique via the same input device. For example, the authenticating input can be provided via a capacitive input capability of the input device, and the encoded data can be provided via a modulated pressure (i.e., for a resistive input capability of the input device). In some embodiments, the input device can be used for handshake communication with the pointing device 112. During the handshake communication, the input device can provide the handshake signal via the appropriate input type to the pointing device 112.

The input device can be implemented as a resistive touchscreen. Depending on the implementation of the resistive touchscreen, the user input can be accessed by the input device by detecting contact between electrically resistive layers or via another resistive touchscreen signal acquisition technique. The user can use the pointing device 112 to provide user input, such as by drawing the authenticating input on the resistive touchscreen. The pointing device 112 can generate and provide the encoded data in the user input. For example, the pointing device 112 can generate the encoded data as a sequence of pulses (and/or other types of non-continuous signals) in the user input. The sequence of pulses can be provided, for example, via a writing tip of the pointing device 112. The writing tip can be used to modulate an actual pressure applied to the resistive touchscreen during application, by the pointing device 112, of the user input. For example, the device application 114 can modulate up and down movement of the writing tip to modulate the actual pressure and to provide the sequence of pulses.

The input device can be implemented as a capacitive touchscreen. Variations of the capacitive touchscreen can include surface capacitance technique, projected capacitance technique, mutual capacitance technique, and/or self-capacitance, among others. Depending on the implementation of the capacitive touchscreen, the user input can be accessed by measuring a distortion of an electrostatic field of the capacitive touchscreen, such as by measuring a change in capacitance. Similarly as discussed above, the user can use the pointing device 112 to provide the user input by drawing the authenticating input on the capacitive touchscreen. Similar to for other types of touchscreens, the pointing device 112 can generate and provide the encoded data in the user input as a sequence of pulses (or other types of non-continuous signals) in the user input.

For capacitive touchscreens, the sequence of pulses can be provided via the writing tip of the pointing device 112 that modulates an electrical connection between the user's hand holding the pointing device 112 and the writing tip of the pointing device 112 that makes contact with the capacitive touchscreen. The pointing device 112 can modulate the connection between the user's hand and the writing tip via a relay (or another device). The device application 114 can, for example, control the relay to break the connection to provide the sequence of pulses at the capacitive touchscreen.

Similar techniques can be used by the pointing device to provide the sequence of pulses (or other types of non-continuous signals) in the user input for other types of input devices. For AR implementation, the input device can detect (e.g., via cameras and/or other sensors) the user input as provided by a gesture provided by a user using (e.g., by wearing or holding) the wearable device 122. The input device can determine the authenticating input from the user input. The wearable device 122 can generate and provide the encoded data in the gesture provided by the user, such as via visual indicators (e.g., lights) of the wearable device 122. Images of these gestures and/or visual indicators can be acquired by the input device.

In some embodiments, the user device is a scanner or a camera that acquires an image of a physical medium (such as paper) where the user input is affixed. For example, the pointing device 112 can be a pen, pencil, marker, or another tool that transfers ink (and/or another liquid or paste for coloring a surface of the physical medium) to a surface of the physical medium. The pointing device 112 can provide the user input to the physical medium, where the user input includes the encoded data and the authenticating input. The pointing device 112 can provide the encoded data in the authenticating input by generating the sequence of pulses (and/or other types of non-continuous signals) in the user input, where the user input can physically attached and/or engraved on the surface of the physical medium. The user device can then acquire an image of this physical input, and perform image analysis on the acquired image to determine the authenticating input and the encoded data.

The pointing device 112 can determine a window of time (referred to as a data application time window) during which the encoded data can be provided at the user input. The pointing device 112 can determine the data application time window based on an average amount of time the user (or a collection of users) take to provide the authenticating input. The pointing device 112 can determine the data application time window based on a length (e.g., in characters) of the user's first and last name. The pointing device 112 can determine, based on the data application time window, a size of the encoded data, and a rate of transfer of the encoded data at the user input, an actual data application duration.

The pointing device 112 can provide the encoded data during the actual data application duration, which can be a portion of the data application time window. In some embodiments, the pointing device 112 can repeat the provisioning of the encoded data during the entire data application time window. For example, if the entire data application time window is 1 second and the actual data application duration is 10 ms, then the pointing device 112 can provide the encoded data several times (e.g., 10 or fewer times) during the data application time window. If the actual data application duration is longer than the data application time window, the pointing device 112 may indicate to the user (such as via haptic feedback, visual feedback, and/or auditory feedback), that the entire encoded data is not transferred. In this case, the user may be prompted to leave the pointing device 112 in contact (such as by providing additional authenticating text) with the input device of the POS device 102 until the pointing device 112 transfers, via the input device, any remaining encoded data to the POS device 102.

In some embodiments, the pointing device 112 can be pre-configured to provide the user input via one of multiple techniques which can include resistive touchscreens and capacitive touchscreens. The pointing device 112 can determine the type of input device used by the POS device 102. The pointing device 112 can then provide the encoded data based on the type of the input device. For example, for an input device with a resistive touchscreen, the pointing device 112 can provide the user input by modulating a resistive signal. Thus, both the authenticating input and the encoded data can be provided to the input device using appropriate input type. In some embodiments, the pointing device 112 can determine to provide the authenticating input using a first input type, and the encoded data using another input type. In some embodiments, the pointing device 112 can be used for handshake communication that uses the appropriate input type with the input device. The pointing device 112 can also receive pulses from the input device via the appropriate input type, which can be different from what is used for the authenticating input and/or the encoded data.

Figure 2:
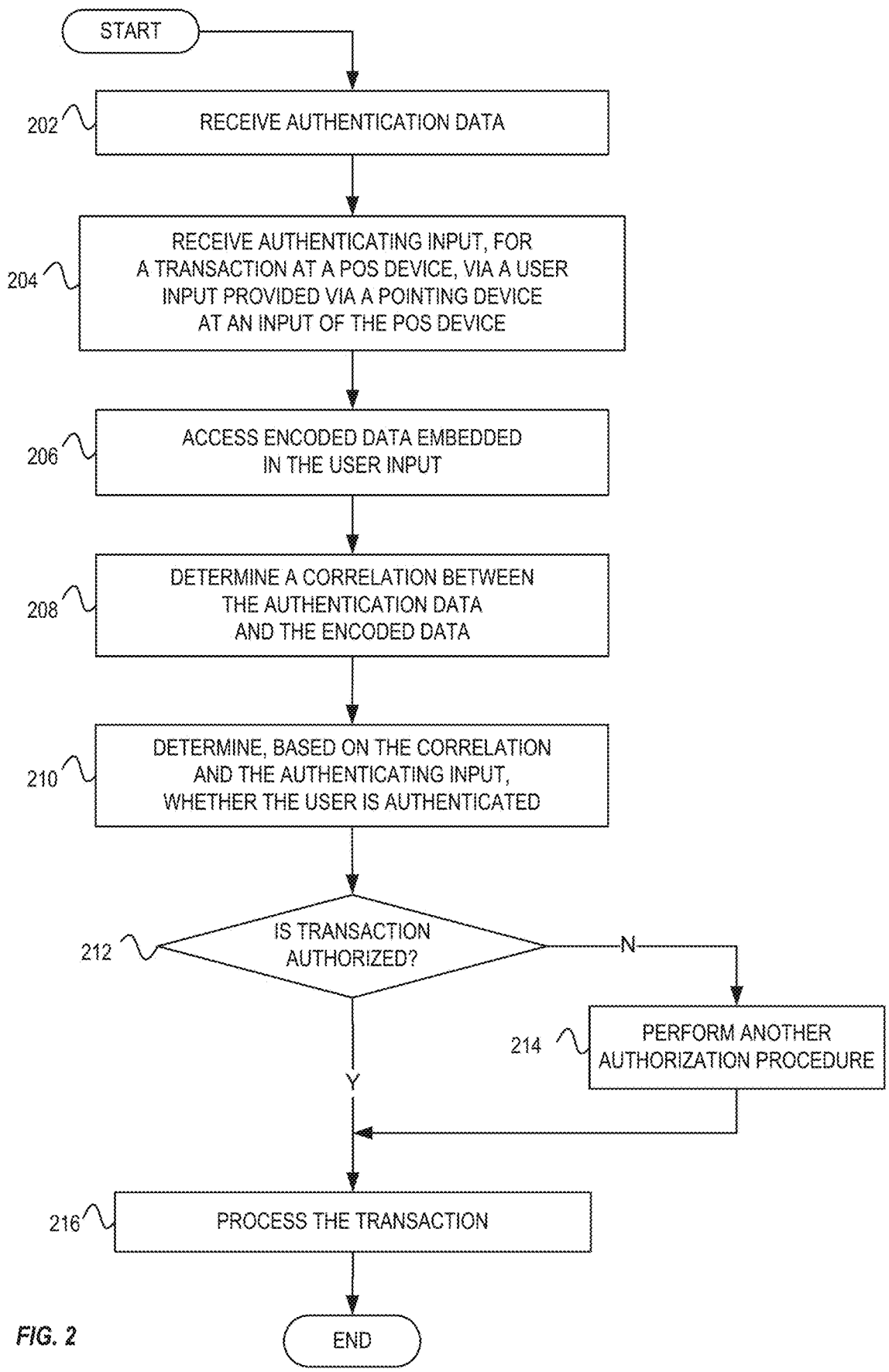
FIG. 2 is a flow diagram illustrating embodiments of operations for facilitating authentication via a pointing device for secure transactions.

FIG. 2 is a flow diagram illustrating embodiments of operations for facilitating authentication via a pointing device for secure transactions. The method of FIG. 2 is described with reference to the systems and components described in FIG. 1 (for illustration purposes and not as a limitation). The example operations can be carried out by the POS application 104.

Beginning with 202, the POS application receives authentication data. With reference to FIG. 1, the POS application 104 can receive the authentication data from the pointing device 112. In some cases the pointing device 112 can be associated with the user and/or the user device 120 (e.g., the pointing device 112 is owned by the user and/or is a part of the user device 120, and/or is configured to directly communicate with the user device 120, where the user device 120 is a trusted device). In these cases, the pointing device 112 can transmit the authentication data, to the POS device 102, responsive to determining that the pointing device 112 is within a communication distance of the POS device 102. The pointing device 112 can transmit the authentication data to the POS device 102 via a short-range communication protocol, such as Bluetooth Low Energy (BLE) or Near Field Communications (NFC), among others.

In some cases, the pointing device 112 can be associated with the POS device 102 (e.g., the pointing device 112 is configured to directly communicate with the POS device 102). In these cases (i.e., where the pointing device 112 is a trusted device), the user device 120 can transmit the authentication data responsive to determining that the user device 120 is within a communication distance of the POS device 102 and/or the pointing device 112. The user device 120 can transmit the authentication data to the POS device 102 and/or the pointing device 112 via the short-range communication protocol, such as BLE or NFC.

At 204, the POS application receives authenticating input, for a transaction at the POS device, via a user input provided via a pointing device at an input of the POS device. With reference to FIG. 1, the POS application 104 can receive the user input via the input device of the POS device, such as via the touchscreen functionality of the display 110. In some embodiments, the user input can be received via a physical medium, such as paper. The POS application 104 can acquire an image of the user input from the physical medium. The POS application 104 can then perform image analysis on the acquired image to determine the authenticating input and the encoded data.

In some embodiments, the POS application 104 can communicate with the authentication server 106 to validate the authentication data for the pointing device 112. Responsive to determining validation of the authentication data by the authentication server 106, the POS application 104 can communicate, to the pointing device 112 and/or to the user device 120, an enabling indication for enabling generation of the encoded data in the user input by the pointing device 112. In some embodiments, the POS application 104 can establish a handshake communication between the pointing device 112 and the POS device 102. The handshake communication can be communicated between the input device and the pointing device 112, such as via the touchscreen functionality of the display 110. For example, the POS application 104 can transmit a handshake signal, via the input device of the POS device, to the pointing device 112. The handshake signal can include the enabling indication for triggering the device application 114 to generate the user input during application of the authenticating input.

In some embodiments, the POS application 104 can determine a required level of authentication for the transaction. The POS application 104 can determine the required level of authentication based on certain characteristics of the transaction, such as whether an amount of funds of the transaction is larger than a certain threshold, a type of the transaction, whether the recipient (e.g., the merchant) and/or the customer (e.g., that is initiating the transaction) is known to have transaction risks, among others. The POS application 104 can, responsive to a determination that the required level of authentication is above an authentication threshold, communicate to the pointing device an enabling indication. The enabling indication can be for enabling generation of the encoded data corresponding to the required level of authentication in the user input.

At 206, the POS application accesses encoded data embedded in the user input. With reference to FIG. 1, the POS application 104 can access the encoded data 118 in the user input. The POS application 104 can access the encoded data based on a type of the input device and/or how the encoded data is provided in the user input. Discussion of some embodiments of accessing the encoded data is provided below with reference to FIGS. 3 and 4.

At 208, the POS application determines a correlation between the authentication data and the encoded data. The correlation can indicate whether the authentication data and the encoded data are both associated with the same user. For example, the correlation can be implemented as a confidence value indicating a likelihood that both of these authentication elements are associated with the same user. With reference to FIG. 1, the POS application 104 can determine whether the correlation value is greater than a certain correlation threshold.

In some embodiments, determining the correlation includes determining that the authentication data received at 202 is an incomplete token, and that the encoded data includes another portion of the complete token. Thus, the complete token can be determined by the POS application, from the incomplete token (e.g., a first portion of the complete token) and the encoded data (e.g., a second portion of the complete token). The POS application 104 can then determine the user authentication based on the complete token.

At 210, the POS application determines, based on the correlation and the authenticating input, whether the user is authenticated. It is noted that if, based on the correlation at 208, that the user is not authenticated, the POS application 104 may not analyze the authenticating input. In some embodiments, at 210 the POS application 104 can analyze input characteristics of the user input to determine whether the input characteristics match user characteristics associated with the user. The input characteristics can indicate how the user input is being provided to the input device via the pointing device 112, and can depend on a type of input device being used, as well as types of sensors being available at the pointing device 112 and/or at the input device.

For example, the pointing device 112 can include sensors such as a gyroscope, an accelerometer, a temperature sensor, a fingerprint sensor, and/or a pressure sensor, among others. The input characteristics can indicate a speed at which the user input is being provided, a pressure at which the pointing device 112 is being pressed onto a surface of the input device, a pressure at which the pointing device 112 is being held by the user, an angle at which the pointing device 112 is being held by the user while providing the user input, among others. The input characteristics can also indicate biometric characteristics (which can be measured by the pointing device 112) of the user, such as the user's body temperature, the user's fingerprint, among others.

The POS application 104 can determine a potential user based on the authentication data, the authenticating input 117, and/or the encoded data 118. The user characteristics for the potential user can be accessed by the POS application 104 locally at the POS device 102 and/or by communicating with the authentication server 106. The POS application 104 can then compare the input characteristics to the user characteristics and determine whether any different in values of the characteristics is within acceptable limits (e.g., as previously determined, such as based on the authentication level). The POS application 104 can then determine user authentication based on determination of whether the input characteristics match the user characteristics. In some embodiments, the POS application 104 can analyze signature characteristics of the authenticating input to determine whether the signature characteristics match user signature characteristics associated with the user as determined based on the authentication data. The POS application 104 can determine the user authentication based on a determination that the signature characteristics match the user signature characteristics.

In some embodiments, where the pointing device is associated with the user device 120 (and is thus not a trusted device of the POS device 102), the POS application 104 can determine whether the pointing device 112 is on a blacklist associated with fraudulent devices. For example, the POS application 104 can access a local database, and/or communicate with the authentication server 106, to determine whether the pointing device 112 (such as by using the authentication data, a reference number of the pointing device 112, or some identifying characteristic of the pointing device 112) is a suspected fraudulent device. Similar determination can be made by the POS application 104 for cases where the pointing device is associated with the POS device 102, and is thus a trusted device. In these cases, the POS application 104 can determine whether the user device 120 is on a blacklist associated with fraudulent devices. The POS application 104 can then determine user authentication if the appropriate device is not on a blacklist.

At 212, the POS application determines whether the transaction is authorized. The POS application 104 can determine, based on authentication of the user of 210, whether the transaction is authorized. The POS application 104 can communicate with the transaction system 108 to determine authorization for the transaction. With reference to FIG. 1, the POS application 104 can determine whether the transaction is authorized for the user at the POS device 102. If the POS application determines that the transaction is authorized, flow continues at 216. Otherwise, flow continues at 214. At 214, the POS application performs another authorization procedure, i.e., one that does not rely on user authentication at the POS device 102. After 214, the flow continues at 210. At 216, the transaction is processed. In some embodiments, the transaction system 108 processes the transaction and returns processing results. In some embodiments, once the user is authenticated at 210, the POS application 104 can transmit, to the transaction system 108, authentication indication indicating whether the customer has been authenticated at the POS device 102 based on the authentication elements. The transaction system 108 can then perform the elements 212-216.

FIG. 3 is a diagram illustrating embodiments of authenticating input and associated encoded data. The input device of the POS device 102 can access the user input 116 and determine the authenticating input 117 and the encoded data 118. FIG. 3 illustrates steps of analysis of the user input 116 (of FIG. 1) by showing initial user input 116A as initially accessed by the input device of the POS device 102, and also processed user input 116B as being processed (e.g., by the POS application 104) for the encoded data 118. As discussed above, the authenticating input 117 and the encoded data can be used as authentication elements by the POS application 104.

As shown in the initial user input 116A, the authenticating input 117 can be implemented by a user signature. However, other textual and/or non-textual identifying inputs can be provided via the authenticating input 117 by the pointing device 112. For example, the authenticating input 117 can include a certain non-textual input that is unique to the user. The authenticating input 117 can be input, via the pointing device 112, as one or more lines (which themselves can be provided via a sequence of pulses for the embedded data, as discussed below).

As shown in the processed user input 116B, the embedded data 118 can be implemented as a sequence of pulses (or other types of non-continuous signals) that are embedded in the authenticating input 117. The embedded data 118 can, for example, be implemented using various length pulses, such as Morse code, for indicating information. The embedded data 118 can be implemented using pulses that indicate data using binary code, ternary code, or other type of communication that can be represented by altering continuity, intensity, and/or frequency of an underlying signal (which is the authenticating input 117 in this case).

In some embodiments, depending on the actual data application duration and on the data application time window, the embedded data 118 may include multiple repetitions of the actual embedded data segments. For example, if the actual data application duration is 10 times longer than the data application time window, then the encoded data 118 can include 10 actual embedded data segments. The encoded data 118 can also include headers and other data structures for error correction and data parity.

FIG. 4 is a diagram illustrating embodiments of encoded data that is embedded in user input. The POS application 104 can determine, from the encoded data 118, at least a portion of input data 404 that can correspond to a key, a token, and/or authenticating identifier that can be used as an authenticating element for authenticating the customer. FIG. 4 illustrates an example where the POS application 104 can process the encoded data 118 to determine the input data

404. For example, the POS application 104 can process the binary code of the encoded data 118 to determine the input data 404.

FIG. 4 also illustrates embodiments where the POS application 104 determines that the encoded data 118 corresponds to a first portion 406 of the complete token, and that the second portion 408 of the complete token is received via other means (such as via the authentication data). In some embodiments, the POS application 104 can determine that the second portion 408 includes an error correction portion of the encoded data 118, which can be used to determine whether the first portion 406 was transmitted properly and/or without errors. The POS application 104 can then use the error correction portion 408 to correct the errors of the first portion 406.

Figure 5:
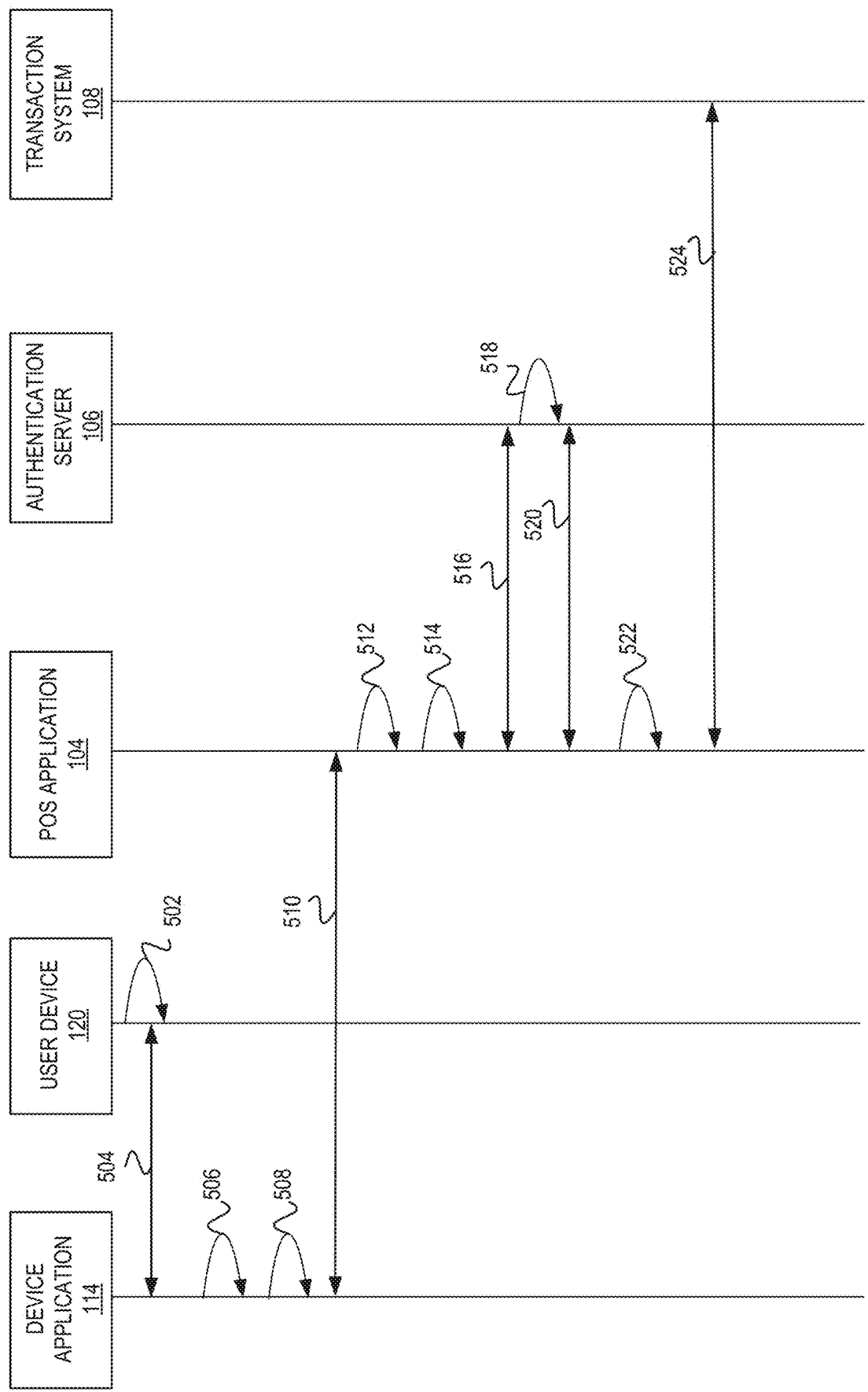
FIG. 5 is a timing diagram illustrating operations for facilitating authentication via a pointing device for secure transactions.

FIG. 5 is a timing diagram illustrating operations for facilitating authentication via a pointing device for secure transactions. As shown by FIG. 5, the device application 114 communicates with the user device 120. The device application 114 also communicates with the POS application 104. The communications of FIG. 5 can be performed over one or more communication networks. Portions of the timing diagram of FIG. 5 correspond to the flow diagram of FIG. 2.

At 502, the user device 120 can determine that it is within a close proximity (e.g., a certain predefined distance) of the pointing device 112. At 504, the user device 120 can communicate authentication data to the device application 114. At 506, the device application 114 can process the authentication data. At 508, the device application 114 can generate encoded data. At 510, the device application 114 can provide the encoded data to the POS application 104 via the user input, when the pointing device 112 is used to apply the user input at the input device of the POS device 102. At 512, the POS application 104 can access the encoded data (as well as the authenticating input) that is provided via the user input.

At 514, the POS application 104 can determine a correlation between the authentication data and the encoded data. At 516, the POS application 104 can communicate the correlation with the authentication server 106. At 518, the authentication server 106 can determine, based on the communication, authentication of the user of the pointing device 112. At 520, the authentication server 106 can communicate with the POS application 104. At 522, the POS application can determine whether the customer is authenticated based at least on analysis of the three authentication elements. At 524, the POS device can then communicate indication of the user authentication to the transaction system 108 for processing of the transaction.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 1-5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system."

Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
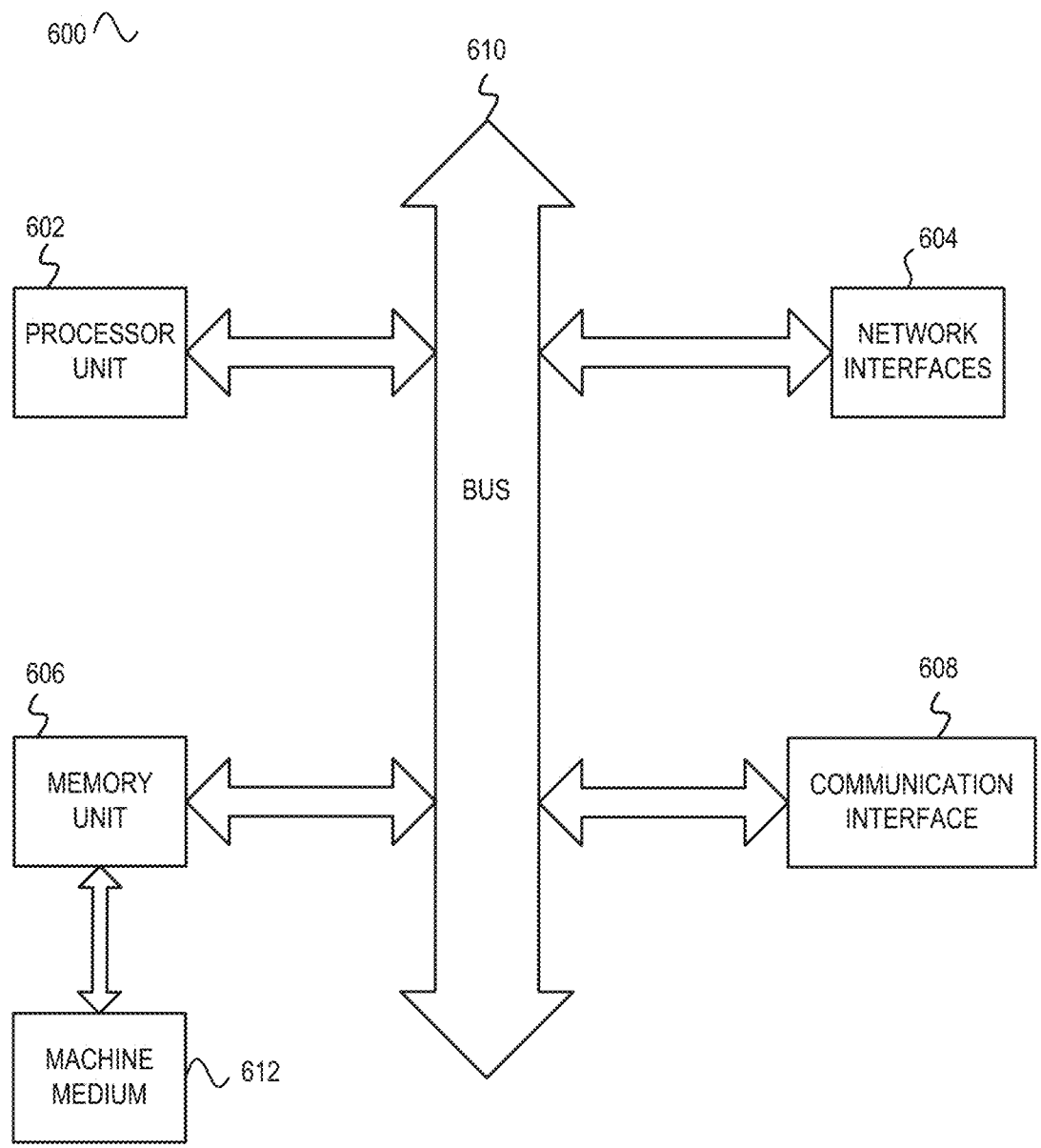
FIG. 6 is a block diagram of embodiments of devices discussed with reference to FIGS. 1-5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities for facilitating authentication via a pointing device for secure transactions. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for facilitating authentication via a pointing device for secure transactions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for authenticating access to remote devices, the method comprising:
   receiving authentication data for authenticating a user for using a pointing device at a Point-of-Sale (POS) device for initiating of a transaction;
   establishing a handshake communication between the pointing device and the POS device;
   transmitting a handshake signal to the point device via the handshake communication;
   receiving, via a touch screen of the POS device, user input that includes an authenticating input and encoded data, the user input provided via the pointing device at a physical surface of the touch screen, the authenticating input for authenticating the user for the transaction, the encoded data embedded in the authenticating input based on the handshake signal via a modulation of an input signal for the authenticating input;
   accessing the authenticating input to determine the encoded data that is embedded in the authenticating input;
   determining the encoded data from the modulation of the input signal for the authenticating input;
   determining a correlation between the authentication data and the encoded data; and
   determining, based on the correlation and the authenticating input, an authentication for initiating the transaction by the user at the POS device.

2. The method of claim 1, wherein
   the authentication data is received from the pointing device; and
   the authentication data indicates a receipt of the authentication data by the pointing device from a user device associated with the user.

3. The method of claim 1, further comprising:
communicating with a server;
validating, via the communicating, the authentication data for the pointing device; and
responsive to the validating, communicating, to the pointing device, an enabling indication for enabling a generation of the encoded data in the user input by the pointing device.

4. The method of claim 1, further comprising:
analyzing input characteristics of the user input, and
determining, based on the analyzing, whether the input characteristics match user characteristics associated with the user as determined from the authentication data;
wherein said determining the authentication is further based on a determination of whether the input characteristics match the user characteristics.

5. The method of claim 1, further comprising:
analyzing signature characteristics of the authenticating input to determine whether the signature characteristics match user signature characteristics associated with the user as determined based on the authentication data;
wherein said determining the authentication is further based on a determination that the signature characteristics match the user signature characteristics.

6. The method of claim 1, wherein the handshake signal triggers the pointing device to provide the encoded data during application of the user input to the physical surface of the POS device.

7. The method of claim 1, wherein said receiving the authenticating input comprises acquiring, by the POS device, an image of the user input from the physical surface and performing an image analysis on the acquired image that determines the authenticating input and the encoded data.

8. The method of claim 1, further comprising:
determining that the pointing device is not on a blacklist associated with fraudulent devices.

9. The method of claim 1,
wherein said determining the correlation comprises determining a complete token based on the authentication data and the encoded data;
wherein the authentication data comprises an incomplete token; and
wherein said determining the authentication comprises determining the authentication based on the complete token.

10. The method of claim 1, further comprising:
determining a required level of authentication for the transaction; and
responsive to a determination that the required level of authentication is above an authentication threshold, communicating, to the pointing device, an enabling indication for enabling a generation of the encoded data corresponding to the required level of authentication in the user input by the pointing device.

11. A system comprising:
a non-transitory memory storing instructions; and
a processor configured to execute the instructions to cause the system to:
receive authentication data, from a user device associated with a user, for authenticating the user for providing authentication elements via a pointing device at a Point-of-Sale (POS) device for initiating of a transaction;
establish a handshake communication between the pointing device and the POS device;
transmit a handshake signal to the point device via the handshake communication;
receive, via a touch screen of the POS device, user input including authentication elements provided via the pointing device at a physical surface of the touch screen, the authentication elements comprising an authenticating input for authenticating the user for the transaction, the authentication elements further comprising encoded data embedded in the authenticating input based on the handshake signal via a modulation of an input signal for the authenticating input;
access the authenticating input to determine the encoded data that is embedded in the authenticating input;
determine the encoded data from the modulation of the input signal for the authenticating input; and
determine, based on the authentication elements, an authentication for initiating the transaction by the user at the POS device based on the authenticating input and the encoded data.

12. The system of claim 11, wherein said determining the authentication comprises:
determining a correlation between the authentication data and the encoded data; and
determining, based on the correlation and the authenticating input, the authentication for initiating the transaction.

13. The system of claim 11, wherein executing the instructions further causes the system to:
analyze input characteristics of the user input to determine whether the input characteristics match user characteristics associated with the user as determined from the authentication data;
wherein said determining the authentication is further based on a determination of whether the input characteristics match the user characteristics.

14. The system of claim 11,
wherein said determining the authentication comprises determining a complete token based on the authentication data and the encoded data;
wherein the authentication data comprises an incomplete token; and
wherein said determining the authentication is further based on the complete token.

15. The system of claim 11, wherein said determining the authentication comprises determining a required level of authentication for the transaction; and
wherein executing the instructions further causes the system to, responsive to a determination that the required level of authentication is above an authentication threshold, communicate, to the pointing device, an enabling indication for enabling a generation of the encoded data corresponding to the required level of authentication in the user input by the pointing device.

16. A non-transitory machine-readable medium having instructions stored thereon, the instructions executable to cause performance of operations comprising:
receiving authentication data for authenticating a user for using a pointing device at a Point-of-Sale (POS) device for initiating of a transaction;
establishing a handshake communication between the pointing device and the POS device;
transmitting a handshake signal to the point device via the handshake communication;
receiving, via a touch screen of the POS device, user input that includes an authenticating input, the user input provided via the pointing device to a physical surface of the touch screen, the authenticating input indicating a user signature for authenticating the user for the transaction, the authenticating input comprising encoded data embedded in the user signature based on the handshake signal via a modulation of an input signal for the authenticating input;

accessing the authenticating input to determine the encoded data that is embedded in the user signature;

determining the encoded data from the modulation of the input signal for the authenticating input;

determining a correlation between the authentication data and the encoded data; and determining, based on the correlation and the authenticating input, an authentication for initiating the transaction by the user at the POS device.

17. The non-transitory machine-readable medium of claim 16, wherein the authentication data is received from the pointing device; and the authentication data indicates a receipt of the authentication data by the pointing device from a user device associated with the user.

18. The non-transitory machine-readable medium of claim 16, wherein the operations further comprise:

analyzing input characteristics of the user input; and determining, based on the analyzing, whether the input characteristics match user characteristics associated with the user as determined from the authentication data;

wherein said determining the authentication is further based on a determination of whether the input characteristics match the user characteristics.

19. The non-transitory machine-readable medium of claim 16, wherein the handshake signal triggers the pointing device to provide the encoded data during application of the user input.

20. The non-transitory machine-readable medium of claim 16, wherein said determining the correlation comprises determining a token based on the authentication data and the encoded data;

wherein the authentication data comprises a first portion of the token;

wherein the encoded data comprises a second portion of the token; and wherein said determining the authentication comprises determining the authentication based on the token.

* * * * *